(12) United States Patent
Dotchkoff et al.

(10) Patent No.: US 11,063,835 B2
(45) Date of Patent: Jul. 13, 2021

(54) IOT CLOUD TO CLOUD ARCHITECTURE

(71) Applicant: Microsoft Technology Licensing, LLC, Redmond, WA (US)

(72) Inventors: Konstantin Dotchkoff, Redmond, WA (US); Ian Vaughan Hollier, Kent, WA (US); Affan Dar, Redmond, WA (US); Ritesh Rao, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 71 days.

(21) Appl. No.: 16/679,850

(22) Filed: Nov. 11, 2019

(65) Prior Publication Data

US 2020/0076703 A1 Mar. 5, 2020

Related U.S. Application Data

(63) Continuation of application No. 15/788,763, filed on Oct. 19, 2017, now Pat. No. 10,476,751.

(51) Int. Cl.
*H04L 12/24* (2006.01)
*H04W 4/70* (2018.01)
*H04W 4/50* (2018.01)
*H04L 29/08* (2006.01)
*H04W 8/18* (2009.01)

(52) U.S. Cl.
CPC ............ *H04L 41/12* (2013.01); *H04L 67/12* (2013.01); *H04W 4/50* (2018.02); *H04W 4/70* (2018.02); *H04L 67/10* (2013.01); *H04W 8/183* (2013.01)

(58) Field of Classification Search
CPC ............ H04W 36/0027; H04W 76/16; H04W 36/0022; H04W 36/28; H04W 36/18; H04W 4/16; H04W 36/30; H04W 8/18; H04W 36/14; H04W 48/18; H04W 88/06; H04W 4/50; H04W 4/70; H04W 8/183; H04L 65/1069; H04L 41/12; H04L 67/12; H04L 67/10
See application file for complete search history.

(56) References Cited

U.S. PATENT DOCUMENTS

2017/0235585 A1* 8/2017 Gupta ................. H04L 41/12 718/1
2017/0353367 A1* 12/2017 Slaight ................ H04L 43/08
(Continued)

OTHER PUBLICATIONS

"Final Office Action Issued in U.S. Appl. No. 15/788,768", dated Dec. 26, 2019, 10 Pages.

*Primary Examiner* — Steven H Nguyen
(74) *Attorney, Agent, or Firm* — Davin Chin; Chin IP, PLLC

(57) ABSTRACT

In one example of the technology, a mapping is established between: IoT devices that are tenants of an IoT support service, and tenants of a first third-party cloud service. On the IoT support service, device twins are stored, such that each device twin corresponds to a corresponding IoT device, and such that each device twins includes at least a first section that includes properties of the corresponding IoT device, and a second section that includes properties associated with the first third-party cloud service. The IoT support service is used to invoke a first method associated with at least one IoT device based on metadata in at least one corresponding device twin. The first method is associated with the first third-party cloud service.

21 Claims, 5 Drawing Sheets

(56) References Cited

U.S. PATENT DOCUMENTS

2018/0246484 A1* 8/2018 Zimmerman .......... G05B 15/02
2018/0295176 A1* 10/2018 Sundaresan ............ G06F 3/167
2020/0367057 A1 11/2020 Dotchkoff et al.

* cited by examiner

IOT CLOUD TO CLOUD ARCHITECTURE

CROSS-REFERENCE TO RELATED APPLICATION(S)

This application is a continuation of U.S. patent application Ser. No. 15/788,763, filed Oct. 19, 2017, entitled "IOT CLOUD TO CLOUD ARCHITECTURE". The entirety of this afore-mentioned application is incorporated herein by reference.

BACKGROUND

The Internet of Things ("IoT") generally refers to a system of devices capable of communicating over a network. The devices can include everyday objects such as toasters, coffee machines, thermostat systems, washers, dryers, lamps, automobiles, and the like. The devices can also include industrial equipment in buildings and factory machines, with sensors and actuators typically attached, and the like. The network communications can be used for device automation, data capture, providing alerts, personalization of settings, and numerous other applications.

SUMMARY OF THE DISCLOSURE

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Briefly stated, the disclosed technology is generally directed to IoT technology.

In one example of the technology, a mapping is established between: IoT devices that are tenants of an IoT support service, and tenants of a first third-party cloud service. On the IoT support service, device twins are stored, such that each device twin corresponds to a corresponding IoT device, and such that each device twins includes at least a first section that includes properties of the corresponding IoT device, and a second section that includes properties associated with the first third-party cloud service. The IoT support service is used to invoke a first method associated with at least one IoT device based on metadata in at least one corresponding device twin. The first method is associated with the first third-party cloud service.

Other aspects of and applications for the disclosed technology will be appreciated upon reading and understanding the attached figures and description.

BRIEF DESCRIPTION OF THE DRAWINGS

Non-limiting and non-exhaustive examples of the present disclosure are described with reference to the following drawings. In the drawings, like reference numerals refer to like parts throughout the various figures unless otherwise specified. These drawings are not necessarily drawn to scale.

For a better understanding of the present disclosure, reference will be made to the following Detailed Description, which is to be read in association with the accompanying drawings, in which.

DETAILED DESCRIPTION

Figure 1:
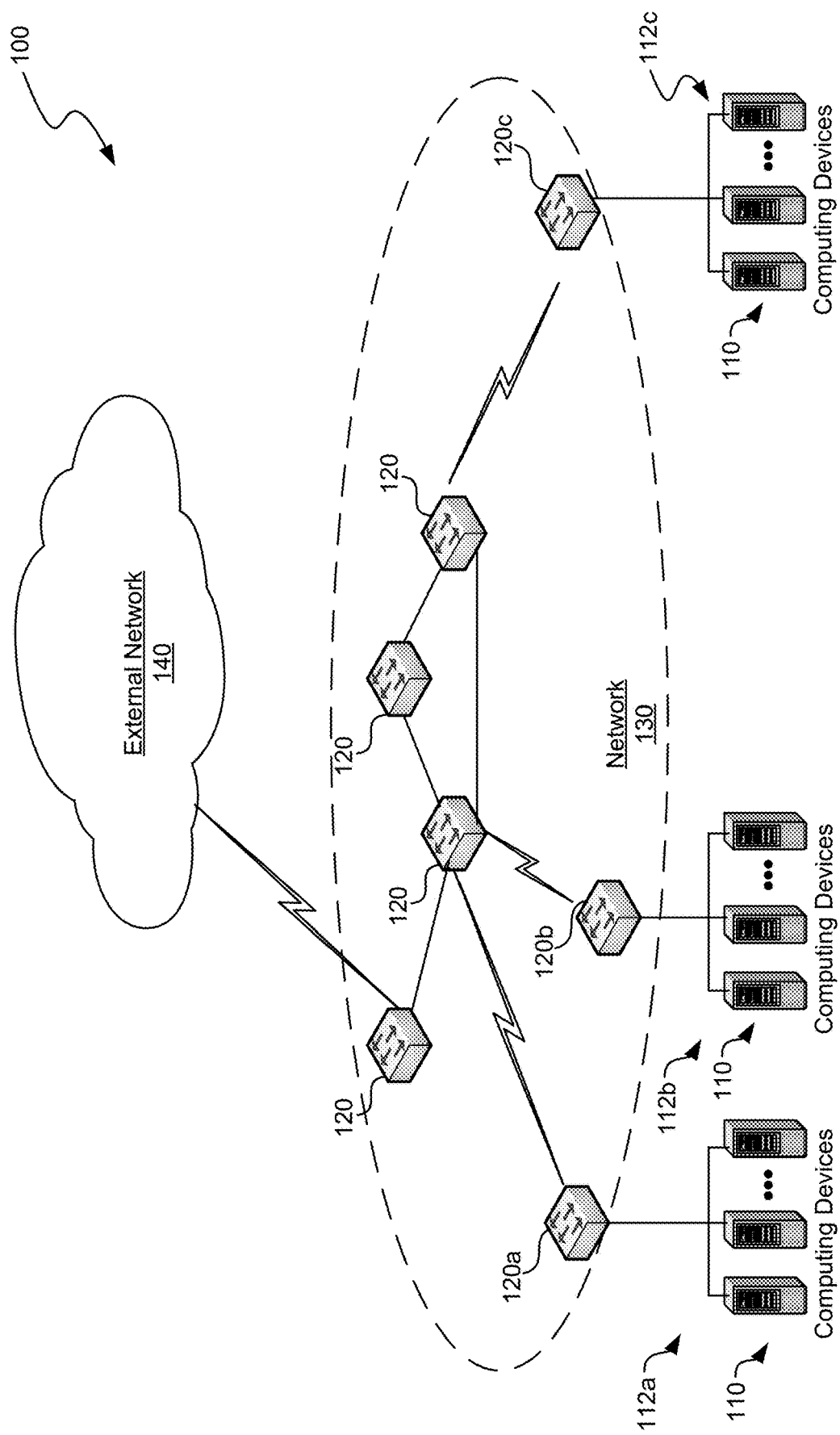
FIG. 1 is a block diagram illustrating one example of a suitable environment in which aspects of the technology may be employed.

The following description provides specific details for a thorough understanding of, and enabling description for, various examples of the technology. One skilled in the art will understand that the technology may be practiced without many of these details. In some instances, well-known structures and functions have not been shown or described in detail to avoid unnecessarily obscuring the description of examples of the technology. It is intended that the terminology used in this disclosure be interpreted in its broadest reasonable manner, even though it is being used in conjunction with a detailed description of certain examples of the technology. Although certain terms may be emphasized below, any terminology intended to be interpreted in any restricted manner will be overtly and specifically defined as such in this Detailed Description section. Throughout the specification and claims, the following terms take at least the meanings explicitly associated herein, unless the context dictates otherwise. The meanings identified below do not necessarily limit the terms, but merely provide illustrative examples for the terms. For example, each of the terms "based on" and "based upon" is not exclusive, and is equivalent to the term "based, at least in part, on", and includes the option of being based on additional factors, some of which may not be described herein. As another example, the term "via" is not exclusive, and is equivalent to the term "via, at least in part", and includes the option of being via additional factors, some of which may not be described herein. The meaning of "in" includes "in" and "on." The phrase "in one embodiment," or "in one example," as used herein does not necessarily refer to the same embodiment or example, although it may. Use of particular textual numeric designators does not imply the existence of lesser-valued numerical designators. For example, reciting "a widget selected from the group consisting of a third foo and a fourth bar" would not itself imply that there are at least three foo, nor that there are at least four bar, elements. References in the singular are made merely for clarity of reading and include plural references unless plural references are specifically excluded. The term "or" is an inclusive "or" operator unless specifically indicated otherwise. For example, the phrases "A or B" means "A, B, or A and B." As used herein, the terms "component" and "system" are intended to encompass hardware, software, or various combinations of hardware and software. Thus, for example, a system or component may be a process, a process executing on a computing device, the computing device, or a portion thereof. Briefly stated, the disclosed technology is generally directed to IoT technology. In one example of the technology, a mapping is established between: IoT devices that are tenants of an IoT support service, and tenants of a first third-party cloud service. On the IoT support service, device twins are stored, such that each device twin corresponds to a corresponding IoT device, and such that each device twins includes at least a first section that includes properties of the corresponding IoT device, and a second section that includes properties associated with the first third-party cloud service. The IoT support service is used to invoke a first method associated with at least one IoT device based on metadata in at least one corresponding device twin. The first method is associated with the first third-party cloud service.

IoT devices may communicate with an IoT support service to receive IoT services, either communicating directly with the IoT support service or indirectly via one or more intermediary devices such as gateway devices. In some examples, the IoT support service may also coordinate third-party cloud services for use by IoT devices. In other examples, devices not normally capable of connecting directly to the IoT support service can be enabled to function as IoT devices through coordination between the IoT support service and a third-party cloud service. For instance, in some examples, devices can communicate with the IoT support service using the third-party cloud service as intermediary. In other examples, the IoT support service can use the third-party cloud service to reconfigure IoT devices and enable a direct connection from the IoT device to the IoT support service, while keeping their ability to connect to the third-party cloud service as well.

Partners that may provide third-party cloud services for IoT devices may be onboarded through a process that registers the third-party cloud services to the IoT support service. During partner onboarding, connections between the third-party cloud service and the IoT support service may be secured.

After partner onboarding, customer onboarding may occur. The customers may make use of the services of a partner, and may have an account and credentials associated with the partner. When a customer initially activates the third-party cloud service along with the IoT support service, a mapping may be established between tenants in the third-party cloud service and tenants in the IoT support service.

Devices may then be provisioned with the IoT support service. After provisioning, communications between the devices and the IoT support services may occur.

In some examples, the IoT support service stores device twins. More specifically, the IoT support service may store a corresponding device twin for each IoT device. In some examples, each device twin is a set of securely isolated primitives comprising communication and state synchronization primitives. In some examples, each device twin includes metadata about the corresponding device, such as what type of device it is, various information about the device, as well as relevant information about the device that the device is in (e.g., type of device, capabilities, location, and/or the like, where relevant to the device). In some examples, at least a portion of each device twin is synchronized with the corresponding IoT device.

The device twin may include properties of the devices, some of which may be synchronized with the device. For example, in the case of a smart lock, the device twin may include a property indicating whether the corresponding smart lock is locked or unlocked. In some examples, the device twin for each device includes a section associated with properties for the third-party cloud service. In this way, the IoT service may synchronize some of those properties with the third-party cloud service and the device twin may provide an overview of the device including properties associated with third-party cloud services. The device twin may expose methods that can be invoked through the IoT support service that correspond to operations in the device. In some examples, if there is more than one third-party cloud service associated with the device that corresponds to the device twin, then the device twin has a separate section for each third-party cloud service.

Some methods may trigger operations to be executed by the IoT device through direct communication between the IoT support service and the IoT device. Other methods, associated with a third-party cloud service, can trigger an action to be executed by the third-party cloud service, in which case the IoT support service may communicate with the third-party cloud service (instead with the IoT device directly). In some cases, methods associated with the third-party cloud service may cause an operation to be executed by the third-party cloud service cloud service on behalf of the device. For example, in the case of devices with SIM cards, a method could be invoked to change a rate plan for a device, which could result in an operation performed by the third-party cloud service.

Illustrative Devices/Operating Environments

FIG. 1 is a diagram of environment 100 in which aspects of the technology may be practiced. As shown, environment 100 includes computing devices 110, as well as network nodes 120, connected via network 130. Even though particular components of environment 100 are shown in FIG. 1, in other examples, environment 100 can also include additional and/or different components. For example, in certain examples, the environment 100 can also include network storage devices, maintenance managers, and/or other suitable components (not shown). Computing devices no shown in FIG. 1 may be in various locations, including on premise, in the cloud, or the like. For example, computer devices no may be on the client side, on the server side, or the like.

As shown in FIG. 1, network 130 can include one or more network nodes 120 that interconnect multiple computing devices no, and connect computing devices no to external network 140, e.g., the Internet or an intranet. For example, network nodes 120 may include switches, routers, hubs, network controllers, or other network elements. In certain examples, computing devices no can be organized into racks, action zones, groups, sets, or other suitable divisions. For example, in the illustrated example, computing devices no are grouped into three host sets identified individually as first, second, and third host sets 112a-112c. In the illustrated example, each of host sets 112a-112c is operatively coupled to a corresponding network node 120a-120c, respectively, which are commonly referred to as "top-of-rack" or "TOR" network nodes. TOR network nodes 120a-120c can then be operatively coupled to additional network nodes 120 to form a computer network in a hierarchical, flat, mesh, or other suitable types of topology that allows communications between computing devices no and external network 140. In other examples, multiple host sets 112a-112c may share a single network node 120. Computing devices 110 may be virtually any type of general- or specific-purpose computing device. For example, these computing devices may be user devices such as desktop computers, laptop computers, tablet computers, display devices, cameras, printers, IoT devices or smartphones. However, in a data center environment, these computing devices may be server devices such as application server computers, virtual computing host computers, or file server computers. Moreover, computing devices no may be individually configured to provide computing, storage, and/or other suitable computing services.

In some examples, one or more of the computing devices 110 is an IoT device, a gateway device, a device that comprises part or all of an IoT support service, a device comprising part or all of an application back-end, or the like, as discussed in greater detail below.

Illustrative Computing Device

Figure 2:
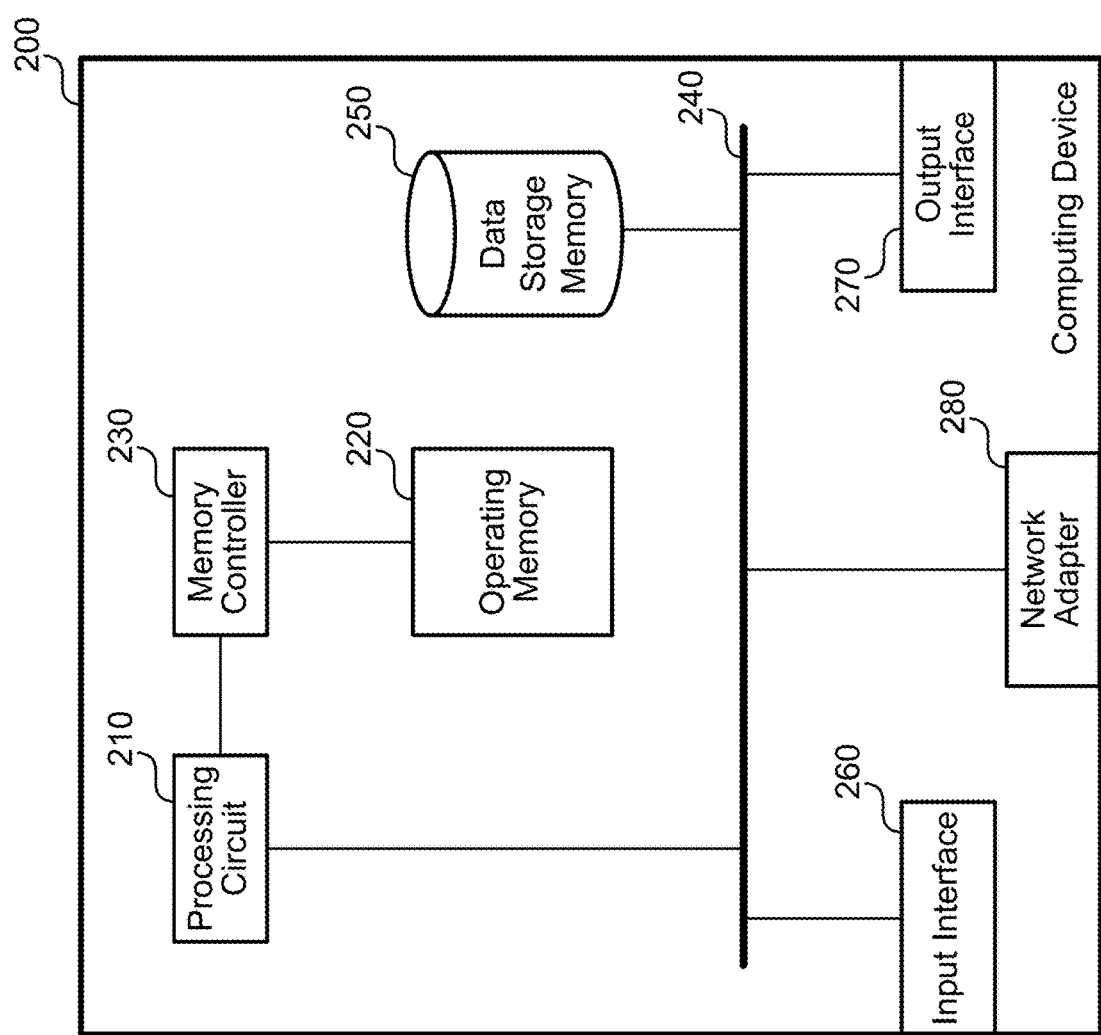
FIG. 2 is a block diagram illustrating one example of a suitable computing device according to aspects of the disclosed technology.

FIG. 2 is a diagram illustrating one example of computing device 200 in which aspects of the technology may be practiced. Computing device 200 may be virtually any type of general- or specific-purpose computing device. For example, computing device 200 may be a user device such as a desktop computer, a laptop computer, a tablet computer, a display device, a camera, a printer, or a smartphone. Likewise, computing device 200 may also be server device such as an application server computer, a virtual computing host computer, or a file server computer, e.g., computing device 200 may be an example of computing device no or network node 120 of FIG. 1. Computing device 200 may also be an IoT device that connects to a network to receive IoT services. Likewise, computer device 200 may be an example any of the devices illustrated in or referred to in FIGS. 3-5, as discussed in greater detail below. As illustrated in FIG. 2, computing device 200 includes processing circuit 210, operating memory 220, memory controller 230, data storage memory 250, input interface 260, output interface 270, and network adapter 280. Each of these afore-listed components of computing device 200 includes at least one hardware element.

Computing device 200 includes at least one processing circuit 210 configured to execute instructions, such as instructions for implementing the herein-described workloads, processes, or technology. Processing circuit 210 may include a microprocessor, a microcontroller, a graphics processor, a coprocessor, a field-programmable gate array, a programmable logic device, a signal processor, or any other circuit suitable for processing data. Processing circuit 210 is an example of a core. The aforementioned instructions, along with other data (e.g., datasets, metadata, operating system instructions, etc.), may be stored in operating memory 220 during run-time of computing device 200. Operating memory 220 may also include any of a variety of data storage devices/components, such as volatile memories, semi-volatile memories, random access memories, static memories, caches, buffers, or other media used to store run-time information. In one example, operating memory 220 does not retain information when computing device 200 is powered off. Rather, computing device 200 may be configured to transfer instructions from a non-volatile data storage component (e.g., data storage component 250) to operating memory 220 as part of a booting or other loading process. In some examples, other forms of execution may be employed, such as execution directly from data storage memory 250, e.g., eXecute In Place (XIP).

Operating memory 220 may include 4th generation double data rate (DDR4) memory, $3^{rd}$ generation double data rate (DDR3) memory, other dynamic random access memory (DRAM), High Bandwidth Memory (HBM), Hybrid Memory Cube memory, 3D-stacked memory, static random access memory (SRAM), magnetoresistive random access memory (MRAM), pseudostatic random access memory (PSRAM), or other memory, and such memory may comprise one or more memory circuits integrated onto a DIMM, SIMM, SODIMM, Known Good Die (KGD), or other packaging. Such operating memory modules or devices may be organized according to channels, ranks, and banks. For example, operating memory devices may be coupled to processing circuit 210 via memory controller 230 in channels. One example of computing device 200 may include one or two DIMMs per channel, with one or two ranks per channel. Operating memory within a rank may operate with a shared clock, and shared address and command bus. Also, an operating memory device may be organized into several banks where a bank can be thought of as an array addressed by row and column. Based on such an organization of operating memory, physical addresses within the operating memory may be referred to by a tuple of channel, rank, bank, row, and column.

Despite the above-discussion, operating memory 220 specifically does not include or encompass communications media, any communications medium, or any signals per se.

Memory controller 230 is configured to interface processing circuit 210 to operating memory 220. For example, memory controller 230 may be configured to interface commands, addresses, and data between operating memory 220 and processing circuit 210. Memory controller 230 may also be configured to abstract or otherwise manage certain aspects of memory management from or for processing circuit 210. Although memory controller 230 is illustrated as single memory controller separate from processing circuit 210, in other examples, multiple memory controllers may be employed, memory controller(s) may be integrated with operating memory 220, or the like. Further, memory controller(s) may be integrated into processing circuit 210. These and other variations are possible.

In computing device 200, data storage memory 250, input interface 260, output interface 270, and network adapter 280 are interfaced to processing circuit 210 by bus 240. Although, FIG. 2 illustrates bus 240 as a single passive bus, other configurations, such as a collection of buses, a collection of point to point links, an input/output controller, a bridge, other interface circuitry, or any collection thereof may also be suitably employed for interfacing data storage memory 250, input interface 260, output interface 270, or network adapter 280 to processing circuit 210.

In computing device 200, data storage memory 250 is employed for long-term non-volatile data storage. Data storage memory 250 may include any of a variety of non-volatile data storage devices/components, such as non-volatile memories, disks, disk drives, hard drives, solid-state drives, or any other media that can be used for the non-volatile storage of information. However, data storage memory 250 specifically does not include or encompass communications media, any communications medium, or any signals per se. In contrast to operating memory 220, data storage memory 250 is employed by computing device 200 for non-volatile long-term data storage, instead of for run-time data storage.

Also, computing device 200 may include or be coupled to any type of processor-readable media such as processor-readable storage media (e.g., operating memory 220 and data storage memory 250) and communication media (e.g., communication signals and radio waves). While the term processor-readable storage media includes operating memory 220 and data storage memory 250, the term "processor-readable storage media," throughout the specification and the claims whether used in the singular or the plural, is defined herein so that the term "processor-readable storage media" specifically excludes and does not encompass communications media, any communications medium, or any signals per se. However, the term "processor-readable storage media" does encompass processor cache, Random Access Memory (RAM), register memory, and/or the like.

Computing device 200 also includes input interface 260, which may be configured to enable computing device 200 to receive input from users or from other devices. In addition, computing device 200 includes output interface 270, which may be configured to provide output from computing device 200. In one example, output interface 270 includes a frame buffer, graphics processor, graphics processor or accelerator, and is configured to render displays for presentation on a separate visual display device (such as a monitor, projector, virtual computing client computer, etc.). In another example, output interface 270 includes a visual display device and is configured to render and present displays for viewing. In yet another example, input interface 260 and/or output interface 270 may include a universal asynchronous receiver/transmitter (UART), a Serial Peripheral Interface (SPI), Inter-Integrated Circuit (I2C), a General-purpose input/output (GPIO), and/or the like. Moreover, input interface 260 and/or output interface 270 may include or be interfaced to any number or type of peripherals.

In the illustrated example, computing device 200 is configured to communicate with other computing devices or entities via network adapter 280. Network adapter 280 may include a wired network adapter, e.g., an Ethernet adapter, a Token Ring adapter, or a Digital Subscriber Line (DSL) adapter. Network adapter 280 may also include a wireless network adapter, for example, a Wi-Fi adapter, a Bluetooth adapter, a ZigBee adapter, a Long Term Evolution (LTE) adapter, SigFox, LoRa, Powerline, 2G, 3G or a 5G adapter.

Although computing device 200 is illustrated with certain components configured in a particular arrangement, these components and arrangement are merely one example of a computing device in which the technology may be employed. In other examples, data storage memory 250, input interface 260, output interface 270, or network adapter 280 may be directly coupled to processing circuit 210, or be coupled to processing circuit 210 via an input/output controller, a bridge, or other interface circuitry. Other variations of the technology are possible.

Some examples of computing device 200 include at least one memory (e.g., operating memory 220) adapted to store run-time data and at least one processor (e.g., processing unit 210) that is adapted to execute processor-executable code that, in response to execution, enables computing device 200 to perform actions.

Illustrative Systems

Figure 3:
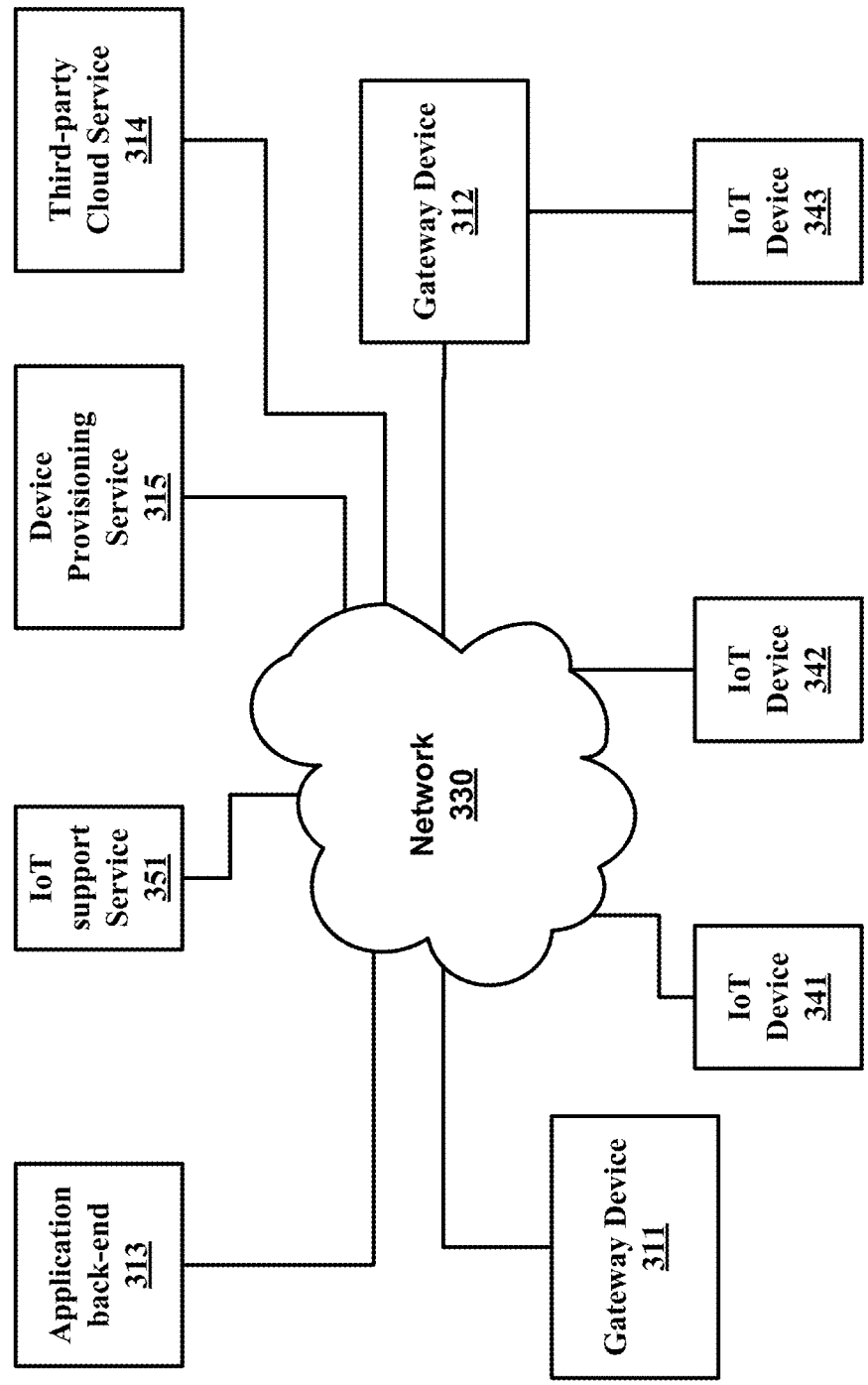
FIG. 3 is a block diagram illustrating an example of a system.

FIG. 3 is a block diagram illustrating an example of a system (300). System 300 may include network 330, as well as IoT support service 351, IoT devices 341-343, gateway edge devices 311 and 312, provisioning service device 315, application back-end 313, and third-party cloud service 314, which all connect to network 330. The term "IoT device" refers to a device intended to make use of IoT services. An IoT device can include virtually any device that connects to the cloud to use IoT services, including for telemetry collection or any other purpose. IoT devices include any devices that can connect to a network to make use of IoT services. IoT devices can include everyday objects such as toasters, coffee machines, thermostat systems, washers, dryers, lamps, automobiles, and the like. IoT devices may also include, for example, a variety of devices, including industrial devices, with attached sensors or actuators. For example, a "smart" building might include lights, temperature sensors, thermostats, humidity sensors, occupancy sensors, door locks, HVAC control modules, and the like. The IoT services for the IoT devices can be used for device automation, data capture, providing alerts, executing operations/actions on the devices through their actuators, and/or personalization of settings. However, the foregoing list merely includes some of the many possible uses for IoT services. Such services may be employed for, or in conjunction with, numerous other applications, whether or not such applications are discussed herein. Some examples allow devices, such as legacy devices, that don't operate as IoT devices, to be enabled to act as IoT devices through additional equipment. For instance, some of the IoT device 341-343 may be mobile devices, various devices with SIM cards such as vending machines with SIM cards, and/or the like, that can be activated to operate as IoT devices. In some examples, IoT devices 341-343 and gateway devices 311 and 312 are edge devices. In some examples, although not shown in FIG. 3, network 330 may also include cloud-side gateway devices.

Application back-end 313 refers to a device, or multiple devices such as a distributed system, that performs actions that enable data collection, storage, and/or actions to be taken based on the IoT data, including user access and control, data analysis, data display, control of data storage, automatic actions taken based on the IoT data, and/or the like. For example, application back-end 313 may include a device or multiple devices that perform back-end functions in support of IoT services. In some examples, at least some of the actions taken by the application back-end may be performed by services and applications running in application back-end 313, while other actions can be taken by IoT devices or third-party cloud services.

Third-party cloud service 314 refers to a device, or multiple devices, that performs actions to provide a third-party cloud service. Examples of third-party cloud services may include update management services, mobile network management services, and the like.

The term "IoT support service" refers to a device, or multiple devices such as a distributed system, to which, in some examples, IoT devices connect on the network for IoT services. In some examples, the IoT support service is an IoT hub. In some examples, the IoT hub is excluded, and IoT devices communicate with an application back-end, directly or through one or more intermediaries, without including an IoT hub, and a software component in the application back-end operates as the IoT support service. IoT devices receive IoT services via communication with the IoT support service.

In some examples, gateway devices 311 and 312 are each a device, or multiple devices such as a distributed system. In some examples, gateway devices may be edge devices that serve as network intermediaries between one or more IoT devices and an IoT support service.

In some examples, device provisioning service 315 refers to a device, or multiple devices such as a distributed system, that perform actions in provisioning an edge device to an IoT support service.

Each of the IoT devices 341-343, and/or the devices that comprise IoT support service 351 and/or application back-end 313 and/or gateway devices 311 and 312 and/or provision service device 315 may include examples of computing device 200 of FIG. 2. The term "IoT support service" is not limited to one particular type of IoT service, but refers to the device to which the IoT device communicates, after provisioning, for at least one IoT application, IoT solution or IoT service. That is, the term "IoT support service," as used throughout the specification and the claims, is generic to any IoT solution. The term IoT support service simply refers to the portion of the IoT solution/IoT service/IoT application to which provisioned IoT devices communicate. In some examples, communication between IoT devices and one or more application back-ends occur with an IoT support service as an intermediary. The IoT support service is in the cloud, whereas the IoT devices are edge devices. FIG. 3 and the corresponding description of FIG. 3 in the specification illustrates an example system for illustrative purposes that does not limit the scope of the disclosure.

Network 330 may include one or more computer networks, including wired and/or wireless networks, where each network may be, for example, a wireless network, local area network (LAN), a wide-area network (WAN), and/or a global network such as the Internet. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including cellular and satellite links, or other communications links known to those skilled in the art. Furthermore, remote computers and other related electronic devices could be remotely connected to either LANs or WANs via a modem and temporary telephone link. In essence, network 330 includes any communication method by which information may travel between IoT support service 351, IoT devices 341-343, and/or application back-end 313. Although each device or service is shown as connected to network 330, that does not mean that each device communicates with each other device shown. In some examples, some devices/services shown only communicate with some other devices/services shown via one or more intermediary devices. Also, other network 330 is illustrated as one network, in some examples, network 330 may instead include multiple networks that may or may not be connected with each other, with some of the devices shown communicating with each other through one network of the multiple networks and other of the devices shown communicating with each other with a different network of the multiple networks.

As one example, IoT devices 341-343 are devices that are intended to make use of IoT services provided by the IoT support service, which, in some examples, includes one or more IoT support services, such as IoT support service 351. IoT devices 341-343 may be coupled to IoT support service 351, directly, via network 330, via a gateway device (e.g., gateway device 312), via multiple gateway devices, via a third-party service, and/or the like.

System 300 may include more or less devices than illustrated in FIG. 3, which is shown by way of example only.

Figure 4:
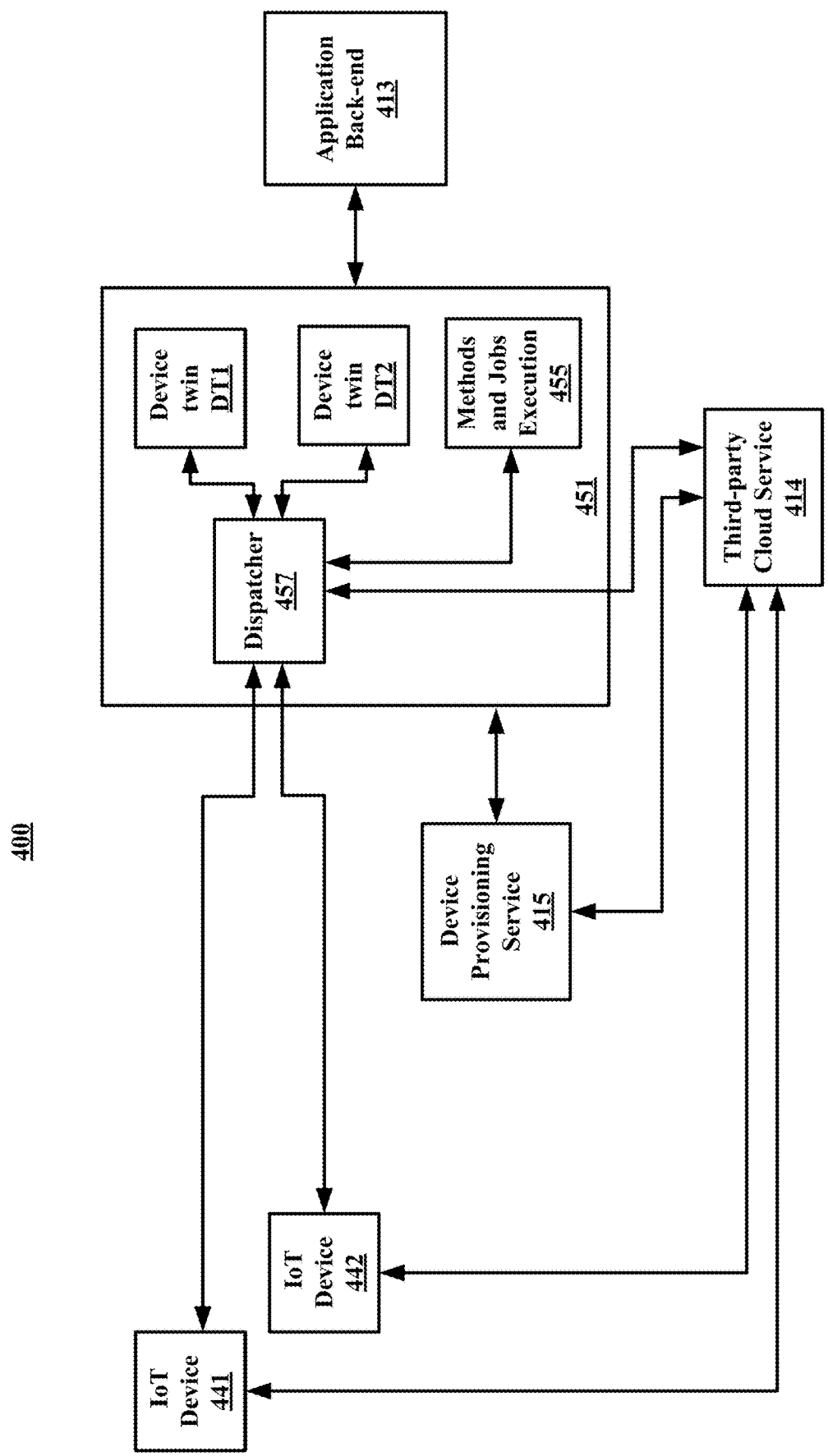
FIG. 4 is a block diagram illustrating an example of a system that may be used as a subset of the system of FIG. 3.

FIG. 4 is a diagram illustrating an example of a system 400. In some examples, system 400 may be employed as a subset of system 300 of FIG. 3. FIG. 4 and the corresponding description of FIG. 4 in the specification illustrate an example system for illustrative purposes that do not limit the scope of the disclosure.

In some examples, system 400 includes IoT device 441, IoT device 442, IoT support service 451, application back-end 413, provisioning service device 415, and third-party cloud service 414. Some examples of IoT support service 451 include device twin DT1, device twin DT2, and dispatcher 457.

In some examples, dispatcher 457 performs functions such as dispatching communications, coordinating telemetry traffic, synchronizing device twin properties, and executing of operations between the IoT support service and IoT devices or third-party cloud services.

In some examples, IoT support service 451 stores a corresponding device twin (e.g., DT1, DT2) for each IoT device (e.g., 441, 442) provisioned with IoT support service 451. In some examples, each device twin is a set of securely isolated primitives comprising communication and state synchronization primitives. In some examples, each device twin includes metadata about the corresponding device, such as what type of device it is, various information about the device, as well as relevant information about the device (or equipment) that the device is in (e.g., type of device, capabilities, location, and/or the like, where relevant to the device). The device twin may also include metadata describing operations associated with a third-party cloud service that are supported, including expected parameters and valid ranges. In some examples, at least a portion of each device twin is synchronized with the corresponding device.

Each device twin may include properties of the devices, some of which may be synchronized with the device. For example, in the case of a smart lock, the device twin may include a property indicating whether the corresponding smart lock is locked or unlocked. In some examples, the device twin for each device includes a section associated with properties for a third-party cloud service. In this way, the device twin may provide an aggregated view of the device across IoT device properties and properties associated with third-party cloud services. In some examples, if there is more than one third-party cloud service associated with the device that corresponds to the device twin, then the device twin has a separate section for each third-party cloud service. The device twins can be used to synchronize device conditions and configurations. In addition, the device twin may expose metadata information about supported operations for this device, including operations associated with third-party cloud services. Application backend 413 may use device twins to query supported operations and expected parameters for execution.

For example, an application, such as an application in the application backend, may query the device twin for a list of available operations (i.e. methods), as well as possible values for the parameters, present this information to an end user to select the intended operation and possible parameter values, and enable the user to trigger the execution of the operation through the IoT support service. As discussed in greater detail below, the device twins may also make functionality provided by third-party cloud services available to application backend 413. In this way, in some examples, when an application queries the device twin for a list of available methods, as well as possible values for parameters, present this information to an end user to select the intended operation and possible parameter values, and enable the user to trigger the execution of the operation through the IoT support service, the response to the query may also include methods made available via third-party cloud services, and the user is also enabled to trigger the execution of methods associated with third-party cloud service, where the IoT support service may communicate with the corresponding third-party cloud service in order to execute the method.

A job can be used to update device twins at scale and/or invoke methods at scale across many devices. In some examples, a method is an interactive request-response pattern used to invoke a capability (or operation) on a device, such as locking or unlocking a door, turning on or off a light, or the like. A job can be used to update device twins and or invoke methods on a schedule and track the progress of execution for a large number of devices. Jobs may be initiated by schedule job instructions received by methods and jobs execution component 455 of IoT support service 451 from application back-end 413. In some examples, dispatcher 457 is configured to dispatch communications to third-party cloud service 414, for example, as part of an invoked method that is associated with third-party cloud service 414.

In some examples, partner onboarding may be used to associate one or more third-party cloud services as providers associated with the IoT services provided by IoT support service 451. During partner onboarding, in some examples, one or more connections are secured between IoT support service 451 and the third-party cloud service 414. In some examples, one or more secure connections are established up front, during the partner onboarding stage, before specific tenants can be connected and start exchanging information over the secure connection(s) in later stages. In some examples, during partner onboarding, multitenant access and integration is configured. In some examples, a registration process is used to register one or more third-party cloud services to IoT support service 451 with a provider registry that may be stored in IoT support service 451.

In some examples, the provider registry stores information about the connection with the third-party cloud service. In some examples, the provider registry also stores information about the third-party cloud service, including a metadata description about what the third-party cloud service can do, including, in some examples, what telemetry the third-party cloud service can emit, and which operations the third-party cloud service supports, including expected parameters and valid parameter values. The provider registry may also store provider configuration information for each provider. In some examples, the provider registry contains all providers configured and available for customers to enable for usage with the IoT support service. In some examples, as part of provider registration, account and tenant information is exchanged, and necessary client IDs (or tenant IDs) and secrets are exchanged. In some examples, IoT support service 451 manages the onboarding of providers for third-party cloud services.

In some examples, after partner onboarding, customer onboarding is performed. In order for third-party cloud services to be performed for devices associated with a particular customer, the customer may need to have an account and credentials with the provider of the third-party cloud service and the customer devices may already be tenants in the third-party cloud service. During customer onboarding, tenant configuration may be performed, which may vary based on the provider. In some examples, a mapping is established between tenants in the third-party cloud service and tenants in the IoT support service. For instance, in some examples, such as a multi-tenant integration between the IoT support service and a third-party cloud service, a mapping is established between tenants in both systems: a customer is represented as a tenant in the multi-tenant IoT support service as well as a tenant of the third-party cloud service and a mapping is established between those tenants to enable exchange of information about the IoT devices of that particular customer, represented as different tenant in both systems. The mapping(s) may allow the exchange of information and data between IoT support service 451 and third-party cloud service 414 over a secure multi-tenant connection for the specific tenant. In some examples, provider metadata and configuration is stored for each registered provider per tenant.

In some examples, after customer onboarding, device provisioning is performed. This occurs next in some examples in which a new customer is onboarded. In some examples, an existing IoT support service customer may add a third-party cloud service, in which case, the devices are already provisioned. In some examples, the customer is a new customer, and the devices associated with the new customer are provisioned after customer onboarding. In some examples, the new devices provisioned are IoT devices that can connect to the device provisioning service 415 directly for provisioning. In this case device provisioning service 415 may coordinate the provisioning of the new devices with the IoT support service and the third-party cloud service. In other examples, the new devices might be already connected to a third-party cloud service and the third-party cloud service can perform the provisioning of the devices into the IoT support service through device provisioning service 415.

In some examples, the new devices may be IoT devices that are not provisioned with the IoT support service yet. In some examples, the new devices might be already connected to a third-party cloud service and the third-party cloud service can perform the provisioning of the devices into the IoT support service through the device provisioning service 415. In other examples, the devices do not normally operate as IoT devices with the IoT support service. For instance, the new devices may be connected via a mobile network, e.g., via a SIM card, but are not configured as IoT devices. However, in some examples, after device provisioning, the mobile network devices are then capable of operating as IoT devices. In this way, in some examples, mobile network devices that do not normally operate as IoT devices with the IoT support service, can be provisioned as IoT devices during device provisioning, including, for example, mobile devices, automobiles, or vending machines with SIM cards, other devices with SIM cards, and/or the like.

Device provisioning may be accomplished in different ways in different examples. In some examples, during physical device installation, a field technician pairs the device with a backend system in application back-end 413 or a by using a handheld/mobile device. In other examples, device installation is accomplished via manual device provisioning by entering provisioning info on the device itself.

In other examples, automatic device provisioning may be used. In some examples of automatic device provisioning, a connectivity endpoint for provisioning the device may be etched in device silicon. In some examples, secrets may also be etched in device silicon. In some examples of automatic provisioning, when the device is first powered on, the device connected to the pre-defined connectivity endpoint for provisioning the device (which for example could be the endpoint of the device provisioning service 415 or third-party cloud service 414). In some examples, a provisioning service, such as device provisioning service 415, is at the pre-defined endpoint, and the device provisioning service 415 may orchestrate provisioning of the device after the device contacts the pre-defined endpoint upon being first powered on. In other examples, the device may connect to the third-party cloud service for provisioning, and the third-party cloud service can then auto-provision the devices with the IoT support service using the device provisioning service.

Regardless of which method is used for device provisioning, from a cloud-to-cloud perspective, in some examples, the provisioning is combined into a single workflow. The device provisioning service can feed information to the third-party cloud service, or information can be fed from the third-party cloud service to device provisioning service 415, so that the device is provisioned in IoT support service 451 at the same time information is fed from the third-party cloud service to IoT support service 451.

In examples of devices with SIM cards, the SIM card ID may be used as a device ID, or the SIM card ID may be mapped to the device ID. In the case of some devices, such as cars, a device ID may already exist, such as the Electronic Serial Number (ESN) of a car component. The ESN of the car component may be used as the device ID, or may be mapped to another device ID. The car may have a SIM card that has another ID, which may also be mapped to the device ID, whether the device ID is the ESN or some other device ID. In some technologies, the SIM ID is the Integrated Circuit Card Identifier (ICCID).

In some examples, during provisioning, the communication channels between the device (e.g., IoT device 441 or 442), third-party cloud service 414, and IoT support service 451 are also established. In some examples, the communication channels are configured such that high-volume, high-velocity telemetry will go directly to IoT support service 451, while Command and Control and/or Device Management communication might be setup through third-party cloud service 414 in some examples. In some examples, during device provisioning, code may be deployed on some of the IoT devices to enables the IoT device to communicate with IoT support service 451.

During device provisioning, in some examples, certain twin properties may be established, including provider ID and provider tenant ID. In some examples, provider-specific device commands (methods) may be configured in the IoT device registry and/or device twin of the IoT support service during device provisioning.

In some examples, when device provisioning occurs after onboarding a new customer, the third-party cloud may push new devices onto IoT support service 451, with devices being bulk imported through provisioning service 415. Third-party IDs may be validated against third-party cloud service 414 as part of the provisioning process. In some examples, the third-party cloud service 414 can be used as an attestation point for the device provisioning into the IoT support service 451. In some examples, a provisioning "on the fly" into the IoT support service can be performed, when a device tries to connect for the first time to the IoT support service, by validating the identity of a device against the third-party cloud service and performing the provisioning immediately.

Third-party specific device properties may be set up with the corresponding device twin during device provisioning, with the third-party provider being responsible for the third-party specific device properties. The IoT Service 451 can synchronize some of the third-party device twin properties with the third-party cloud service. Third-party specific device properties may be queried by other sources, but changes to some of the third-party specific device properties may be restricted to initiation by the corresponding third-party cloud service in some examples. Actions for secure communications to and from provisioned devices, and actions for authentication of provisioned devices, may also be performed during device provisioning, based on configurations established during customer onboarding.

In some examples, after an IoT device is provisioned, the device has a corresponding device twin stored in the IoT support service. In some examples, the root of the device twin includes read-only properties from the corresponding device identity stored in the identity register. The device twin may also include the following: properties, and third-party cloud service properties. Properties may be of different types, including, in some examples, properties that are synchronized, and properties that include metadata that is not synchronized. In some examples, properties may include reported properties and desired properties.

As discussed above, in some examples, devices connected via mobile networks that do not normally operate as IoT devices with the IoT support service can be provisioned as IoT devices during device provisioning, including, for example, mobile devices, automobiles, or vending machines with SIM cards, other devices with SIM cards, and/or the like. During customer onboarding, in some examples, mapping between tenants in the third-party cloud service and tenants in the IoT support service is established. In some examples, IoT support service 451 does not directly perform actions such as activating a SIM card, but such actions can be initiated in the IoT support service 451 through an invoked method, so that ultimately the third-party cloud service activates the SIM card via communication with and coordination by IoT support service 451.

Properties may be used to synchronize device configuration or conditions. Examples of properties may include, for instance: in the case of a smart light, whether the light is on or off; and in the case of a smart lock, whether the lock is locked or unlocked. In some examples, third-party properties are device properties associated with the third-party cloud service. For example, in the case of a third-party cloud service that is a mobile network management service, third-party properties may include data usage for the current billing period, data maximum, attributes of the SIM card for the corresponding device, and/or the like.

Accordingly, in some examples, a device twin may have separate sections including a properties section that stores properties, a third-party cloud service section that stores properties associated with a third-party cloud service, and a section that includes the root of the device twin, which includes read-only properties from the corresponding device identity stored in the identity register. A device may be associated with multiple third-party cloud services, in which case the device twin may have multiple third-party cloud service sections, one for each third-party cloud service associated with the device. The third-party cloud service section of the twin may also include some or all of the information stored in the provider registry for the provider corresponding to the third-party cloud service. In some examples, if there is more than one third-party cloud service associated with the corresponding IoT device, the device twin has a separate section for each third-party cloud service.

As discussed above, jobs may be initiated by create or schedule job instructions received by the methods and jobs execution component 455 of IoT support service 451 from application back-end 413. In some examples, methods include not just methods associated with the IoT device directly, but also methods associated with third-party cloud service. For example, in the case of devices with SIM cards, a method could be invoked to change a rate plan on a device, to activate a SIM card, to deactivate a SIM card, or the like.

There are a variety of other actions that can be performed as invoked methods based on third-party cloud services. For example, IoT support service 451 can reset, e.g., a cellular or other mobile network connection via an invoked method, for troubleshooting purposes. In some examples, IoT support service 451 does not directly communicate with a device to reset a mobile network connection, but invokes a method will ultimately involve dispatcher 457 sending communications to third-party cloud service 414 so that third-party cloud service 415 causes the connected device to reset its mobile network connection. Metadata that includes information such as where particular commands should be sent (e.g., to the device or to the third-party cloud service), and where messages associated with a device should be sent, such as where telemetry data from devices should be sent, may be stored in digital twin corresponding to the device and/or the metadata description for the provider in the provider registry. Methods and jobs execution component 455 may orchestrate methods associated with third-party cloud services even where the third-party cloud service communicates with devices.

When a method is invoked on IoT devices, IoT support service 451 determines whether to execute the method directly to the device, or via a third-party cloud service. The determination is made based on the way the IoT devices on which the method is being invoked is registered with IoT support service 451 during provisioning. During provisioning the device is registered in the IoT support service and this registration also has information about which third-party cloud service providers are enabled for the device. Methods that are accomplished with a third-party cloud service (as well as methods that are accomplished directly with the corresponding IoT device) are exposed in the device twin, so that the device twins can be queried in order to determine which methods are available to be invoked, and to determine which parameters are valid for execution of the method.

As one example, for a software update, IoT support service 451 may receive commands from application back-end 413 for devices to receive software updates, where the software updates for the devices are performed by a third-party cloud service. IoT support service 451 may then initiate a software update by invoking a method and communication with the corresponding third-party cloud service. IoT support service 451 may also track the progress of the update via communication with the third-party cloud service, and may provide the status to application backend 413 in response to queries from application backend 413. After the update is complete, as determined by IoT support service 451 based on communication with the third-party cloud service, the IoT support service may report the update completion to application backend 413. Various other steps may also be performed during the update process which are orchestrated by IoT support service 451.

A variety of different third-party cloud services may be employed in different examples. Some examples of a third-party cloud service are mobile network management services as discussed above. In other examples, a third-party cloud service may be a device management service for updating firmware and/or software, or the like. In other examples, a device management service may include configuration management, remote diagnostics and troubleshooting, and/or the like. In some examples, a third-party cloud service may be a device management service and/or update service for a specific type of device, such as a car.

After devices are provisioned, communications to and from the device may occur as configured. In some examples, some communications to and from devices may occur with the third-party cloud service, and in other examples, some communications to and from the device may occur directly from the device to IoT support service 451. For instance, in an example in which the third-party cloud service performs device management for cars, in some examples, the car sends telemetry messages to the IoT support service, including such information as GPS location, battery level, fuel level, oil temperature, and/or the like. In some examples, the car can also receive commands from the IoT support service directly. However, updates may be triggered via the third-party cloud service and communicated from the third-party cloud service to the devices being updated.

Provisioned IoT devices may be integrated with both IoT services controlled by the IoT support service and one or more integrated third-party cloud services. An IoT application, e.g., in the application back-end, can read telemetry from the IoT support service, regardless of whether the telemetry data originates directly from the IoT device or via a third-party cloud service.

Figure 5:
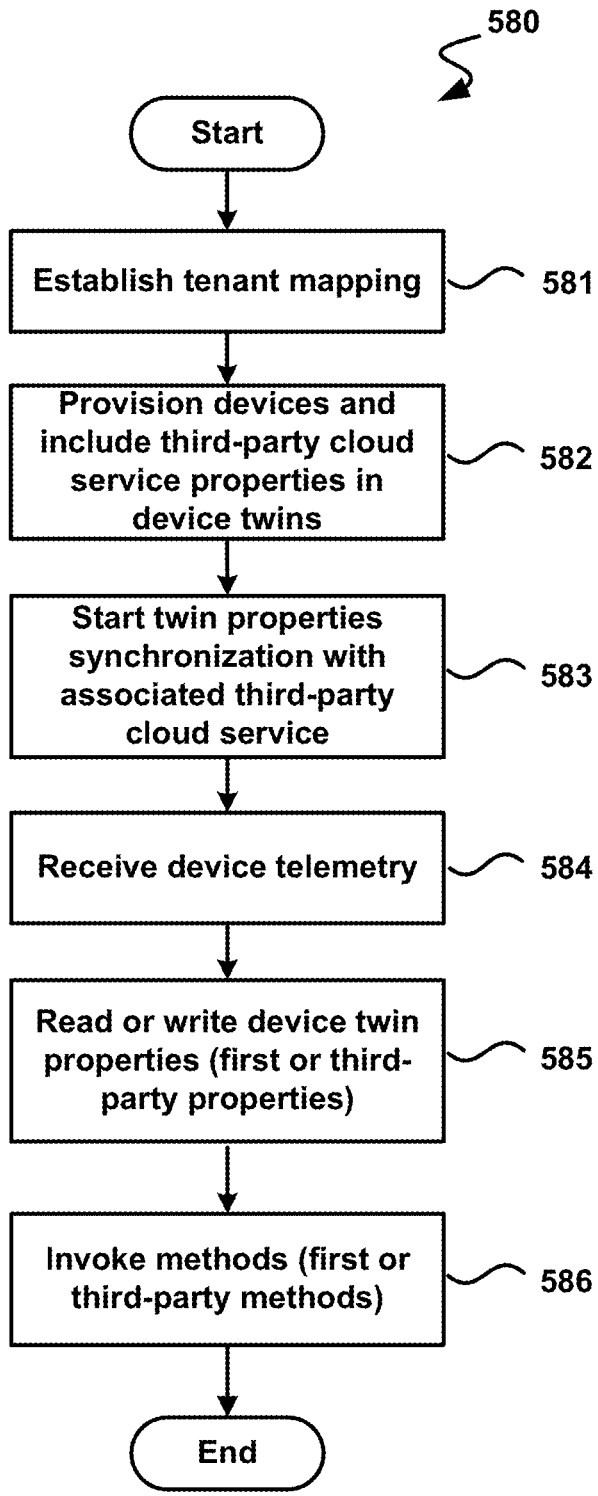
FIG. 5 is a flow diagram illustrating an example process for IoT technology in accordance with aspects of the present disclosure.

FIG. 5 is a flow diagram illustrating an example process (580) for IoT technology, that may be performed by an IoT support service, such as the IoT support service of FIG. 3 and/or FIG. 4.

In the illustrated example, step 581 occurs first. At step 581, in some examples, a mapping is established between: a plurality of IoT devices that are tenants of an IoT support service, and tenants of a first third-party cloud service. For this tenant mapping, in some examples, a mapping is established, for each tenant, between the tenant (representing a customer) in the IoT support service and the tenant in the first third-party cloud service (representing the same customer). In some examples, each customer has an identifier that identifies the customer in the IoT support system, and another identifier that represents the customer in the first third-party cloud service. In some examples, the tenant mapping is a mapping, for each customer that is a tenant in both the IoT support service and the first third-party cloud service, between the identifier for the customer in the IoT support service and the identifier for the customer in the first third-party cloud service.

As shown, step 582 occurs next in some examples. At step 582, in some examples, on the IoT support service, a plurality of device twins are stored, such that each device twin of the plurality of device twins corresponds to a corresponding IoT device, and such that each device twin of the plurality of device twins includes at least a first section that includes properties of the corresponding IoT device, and a second section that includes properties associated with the first third-party cloud service.

As shown, step 583 occurs next in some examples. At step 583, in some examples, on the device twins, some of the device properties between the third-party cloud service and the IoT support service are synchronized. In some examples, step 583 applies changes to properties both ways (device properties associated with the third-party cloud service to properties associated with the IoT support service, and vice versa). As shown, step 584 occurs next in some examples.

At step 584, in some examples, device telemetry is received. The telemetry may be coming from the device directly, via the third-party cloud service, or from both. In some examples, different information comes from the device and from the third-party cloud service. For instance, in some examples, the device might be sending a set of attributes about an environment such as temperature, pressure, and/or the like, while a third-party cloud service might send information related to a subcomponent or operational metrics such as quality of service metrics (e.g., of a cellular service, or software management service).

As shown, step 585 occurs next in some examples. At step 585, in some examples, reading and writing of properties on the device twins occur. This include both device properties of the third-party cloud service and the device properties associated with the IoT support device. In some examples, some of the properties can be written to be changed, and other properties are changed only upon a corresponding change for the property being reported from the corresponding device. In some examples, read and/or write requests may be received from an application in the application backend that initiates the request. In response to write commands, e.g., write commands received from an application in the application back-end, both properties associated with the third-party cloud service in the second section of the devices twins, and properties associated with at least one of device configurations or device conditions of the corresponding IoT device in the first section of the device twins, can be changed (dependent on security permissions and control for each section separately as described earlier). In some examples, changes of the properties associated with the third-party cloud service will be propagated to the device twins according to step 583 and applications from the application backend will be able to query always the most recent values stored in the device twin. This is true also for queries against multiple devices or all devices.

As shown, step 586 occurs next in some examples. At step 586, in some examples, the IoT support service is used to invoke a first method associated with at least one IoT device based on metadata in at least one corresponding device twin of the plurality of device twins. In some examples, the first method is associated with the first third-party cloud service.

The process may then proceed to the return block, where other processing is resumed.

CONCLUSION

While the above Detailed Description describes certain examples of the technology, and describes the best mode contemplated, no matter how detailed the above appears in text, the technology can be practiced in many ways. Details may vary in implementation, while still being encompassed by the technology described herein. As noted above, particular terminology used when describing certain features or aspects of the technology should not be taken to imply that the terminology is being redefined herein to be restricted to any specific characteristics, features, or aspects with which that terminology is associated. In general, the terms used in the following claims should not be construed to limit the technology to the specific examples disclosed herein, unless the Detailed Description explicitly defines such terms. Accordingly, the actual scope of the technology encompasses not only the disclosed examples, but also all equivalent ways of practicing or implementing the technology.

We claim:

1. An apparatus for Internet of Things (IoT) communication, comprising:
an IoT support service including one or more devices, the devices including at least one memory adapted to store run-time data, and at least one processor that is adapted to execute processor-executable code that, in response to execution, causes the IoT support service to perform actions, the actions including:
establishing a mapping between a plurality of IoT devices that are tenants of the IoT support service and tenants of a third-party cloud service;
on the IoT support service, storing a plurality of device twins such that each device twin of the plurality of device twins corresponds to a corresponding IoT device, and such that each device twin of the plurality of device twins is adapted to store telemetry data received from the corresponding IoT device; and
servicing, by the IoT support service, a query for telemetry associated with one or more of the IoT devices of the plurality of IoT devices using the telemetry data stored by one or more corresponding device twins of the plurality of device twins.

2. The apparatus of claim 1, wherein at least one of the device twins is adapted to synchronize the telemetry data with the corresponding IoT device.

3. The apparatus of claim 1, wherein the device twins of the plurality of device twins are further adapted to receive additional telemetry data from the third-party cloud service.

4. The apparatus of claim 1, wherein the plurality of IoT devices include mobile network connected devices that are provisioned as IoT devices.

5. The apparatus of claim 1, wherein each of the device twins of the plurality of device twins is also adapted to store at least one of an expected value or an expected value range for the received telemetry data.

6. The apparatus of claim 1, wherein each of the device twins of the plurality of device twins also includes metadata regarding at least one of telemetry available from the third-party cloud service or where the received telemetry data is to be sent.

7. A method, comprising:
mapping a plurality of IoT devices that are tenants of an IoT support service to tenants of a third-party cloud service;
storing, on the IoT support service, a plurality of device twins such that each device twin of the plurality of device twins corresponds to a corresponding IoT device, and such that each device twin of the plurality of device twins stores telemetry data received from the corresponding IoT device; and
servicing, by the IoT support service, a query for telemetry associated with one or more of the IoT devices of the plurality of IoT devices using the telemetry data stored by one or more corresponding device twins of the plurality of device twins.

8. The method of claim 7, wherein at least one of the device twins is adapted to synchronize the telemetry data with the corresponding IoT device.

9. The method of claim 7, wherein the device twins of the plurality of device twins are further adapted to receive additional telemetry data from the third-party cloud service.

10. The method of claim 7, further comprising synchronizing the telemetry data received from the corresponding IoT device with the third-party cloud service.

11. The method of claim 7, wherein each of the device twins of the plurality of device twins is also adapted to store at least one of an expected value or an expected value range for the received telemetry data.

12. The method of claim 7, wherein each of the device twins of the plurality of device twins also includes metadata regarding at least one of telemetry available from the third-party cloud service or where the received telemetry data is to be sent.

13. The method of claim 7, wherein the third-party cloud service is associated with at least one of device management, mobile network connectivity management, or software update management.

14. The method of claim 7, wherein each device twin further includes properties of the corresponding IoT device associated with another third-party cloud service.

15. The method of claim 7, wherein at least one IoT device of the plurality of IoT devices is at least one of a mobile network connected device, a vehicle, or a vending machine.

16. The method of claim 7, further comprising:
automatically provisioning, with the IoT support service, a plurality of devices associated with the third-party cloud service.

17. The method of claim 7, further comprising:
receiving instructions to write properties from an application in an application backend; and
adjusting properties in the device twins of the plurality of device twins based on the received instructions, including adjusting at least one of:
  properties in the device twins of the plurality of device twins associated with the third-party cloud service; or
  properties in the device twins of the plurality of device twins associated with at least one of device configurations or device conditions of the corresponding IoT device.

18. A processor-readable storage medium, having stored thereon processor-executable code for causing a computing device to perform operations, the operations comprising:
storing associations between a plurality of IoT devices that are tenants of an IoT support service and tenants of a third-party cloud service;
persisting, on the IoT support service, a plurality of device twins that correspond to corresponding IoT devices, wherein each device twin of the plurality of device twins stores telemetry data received from the corresponding IoT device; and
handling, by the IoT support service, a query for telemetry associated with one or more of the IoT devices of the plurality of IoT devices using the telemetry data stored by one or more corresponding device twins of the plurality of device twins.

19. The processor-readable storage medium of claim 18, wherein at least one of the device twins is adapted to synchronize the telemetry data with the corresponding IoT device.

20. The processor-readable storage medium of claim 18, wherein the device twins of the plurality of device twins are further adapted to receive additional telemetry data from the third-party cloud service.

21. The processor-readable storage medium of claim 18, wherein each of the device twins of the plurality of device twins is also adapted to store at least one of an expected value or an expected value range for the received telemetry data.

* * * * *